United States Patent [19]

Maeda

[11] Patent Number: 4,770,361

[45] Date of Patent: Sep. 13, 1988

[54] WEB TAKEUP APPARATUS

[75] Inventor: Yutaka Maeda, Ishehara, Japan

[73] Assignee: Minolta Camera Kabushiki Kaisha, Osaka, Japan

[21] Appl. No.: 70,719

[22] Filed: Jul. 7, 1987

[30] Foreign Application Priority Data

Jul. 8, 1986 [JP] Japan .................. 61-160332
Jul. 8, 1986 [JP] Japan .................. 61-160333

[51] Int. Cl.⁴ .................. B65H 18/08; B65H 75/28
[52] U.S. Cl. .................. 242/67.1 R; 242/74.2; 242/57
[58] Field of Search .......... 242/74, 74.1, 74.2, 242/67.1 R, 67.2, 76, 195

[56] References Cited

U.S. PATENT DOCUMENTS

| | | | |
|---|---|---|---|
| 2,931,591 | 4/1960 | Zorn | 242/74.2 |
| 4,010,912 | 3/1977 | Dreher et al. | 242/74 X |
| 4,099,682 | 7/1978 | Benuska | 242/74 X |
| 4,218,032 | 8/1980 | Nagel et al. | 242/74 X |
| 4,504,026 | 3/1985 | Serizawa et al. | 242/76 X |
| 4,531,685 | 7/1985 | White | 242/74.1 |
| 4,544,110 | 10/1985 | Nagel | 242/67.1 R |
| 4,605,179 | 8/1986 | Arbter | 242/74 X |
| 4,695,005 | 9/1987 | Gietman | 242/74 X |

FOREIGN PATENT DOCUMENTS 51-276 1/1976 Japan .

Primary Examiner—John M. Jillons
Attorney, Agent, or Firm—Wenderoth, Lind & Ponack

[57] ABSTRACT

A web takeup apparatus comprising a takeup core, a guide assembly and a position setting device. The takeup core has a substantially cylindrical shape and is rotatable by a drive mechanism. This core defines a slit for receiving a leading end of the web, and contains an engaging mechanism at a position adjacent the slit for engaging the leading end of the web. The guide assembly acts to guide the leading end of the web to the takeup core when in an initial position, the guide assembly being movable from the initial position. The position setting device acts to set the slit of the takeup core to a position opposed to an outlet opening of the guide assembly in the initial position.

10 Claims, 6 Drawing Sheets

WEB TAKEUP APPARATUS

FIELD OF THE INVENTION

The present invention relates to a web takeup apparatus for use in a laser imager or other image-forming machine, and more particularly to a web takeup apparatus including a takeup core for automatically taking up a web in an elongate sheet form such as a film, type, printing paper or the like transported through a guide assembly.

BACKGROUND OF THE INVENTION

A known example of such web takeup apparatus is disclosed in Japanese Utility Model Publication No. 51-276. This apparatus comprises an oscillatable guide member for guiding a web or film to a takeup core, and an arm member including a pressure roller at a distal end thereof for moving the guide member away in accordance with a radius of the film wound around the core. With this takeup apparatus, a film takeup operation is carried out after a leading end of the film is pressed upon the periphery of the takeup core and wound therearound twice or so.

Another known example is disclosed in Japanese Patent Publication No. 58-32149. This takeup apparatus comprises an oscillatable guide member for guiding a photographic material in the form of a rolled sheet to a takeup core, and a soft belt-like member attached to a distal end of the guide member for contacting the photographic material taken up by the core to press and tighten the material. With this takeup apparatus also, a takeup operation takes place after a leading end of the photographic material is wound around the periphery of the takeup core twice or so.

The foregoing known examples have various problems. In the first place, it is necessary in both examples to feed the web in an amount corresponding to twice the outer periphery of the takeup core prior to a takeup operation in order for the leading end of the web to wind around the takeup core. That amount of the web corresponding to twice the outer periphery of the core is therefore unavailable for recording images.

Second, it is difficult to always assure retention of the leading end of the web on the takeup core, which tends to result in detriments to a subsequent takeup operation. Third, the arm member or the belt-like member must be constructed and attached with great care, and complaints have been heard of its complexity also.

Other problems include possibilities of damage done to the web by the pressure applied to press the web against the takeup core. Such pressure must be strictly uniform transversely of the web, and any pressure imbalance may result in transverse deviations in the web winding and other serious consquences. The known apparatus have also been found unsatisfactory in that different widths of the web require different takeup apparatus specially suited thereto.

SUMMARY OF THE INVENTION

An object of the present invention therefore is to provide a web takeup apparatus permitting the leading end of a web to be engaged by a takeup core reliably without wasting the web.

Another object of the invention is to provide a web takeup apparatus capable of taking up the web without damaging the web.

A further object of the invention is to provide a web takeup apparatus capable of accommodating various web widths.

In order to fulfill these and other objects and to produce advantageous effects the invention provides a web takeup apparatus for taking up a web fed thereto, comprising the following characterizing features: a substantially cylindrical rotatable core for taking up the web on a peripheral surface thereof, a slit defined longitudinally of the core for receiving a leading end of the web, engaging means disposed adjacent the slit for engaging the leading end of the web received through the slit, guide means disposed adjacent the core for guiding the web fed thereto into the slit, and drive means for driving the core in a direction to take up the web.

This web takeup apparatus may further comprise detecting means for detecting the leading end of the web fed to the core, and position setting means for setting the slit to a position opposed to the guide means when the detecting means detects the leading end of the web.

The above engaging means may include a roller rotatable in a direction to receive the web, and an elastic member provided for pressure contact with the roller, the engaging means engaging the leading end of the web by nipping the leading end of the web between the roller and the elastic member.

The guide means may be oscillatable about an axis extending parallel to the core, through contact with the web taken up by the core and in an amount determined by a radius of the web taken up by the core. Further, the guide means may be movable by a tension applied thereto by the web at takeup times. In the latter case, detecting means may be provided for detecting the movement of the guide means thereby to detect a proper engagement of the leading end of the web with the core.

The web takeup apparatus may further comprise control means for operating the drive means upon lapse of a predetermined time after the web detecting means detects the leading end of the web and for stopping the drive means when the detecting means fails to detect the movement of the guide means after the drive means is operated.

For taking up the web according to the present invention, the guide means is in the initial position and the core is set by the position setting means to the position with the slit opposed to the outlet opening of the guide means.

The leading end of the web is guided by the guide means to advance from the outlet opening into the slit of the core and reaches the engaging means.

Thereafter the drive means starts the core rotating whereupon the leading end of the web is engaged by the engaging means and automatically wound around the core in a reliable manner. The web is then reliably taken up by the core.

The web may be engaged by the core by using only a small part at the leading end thereof. Since the amount of the web necessary for the engagement is insignificant, waste of the web is reduced to a great extent. The use of the engagement means assures a reliable winding of the leading end of the web onto the core and a reliable takeup operation to follow. The engaging means has a simple construction and does not press the web against the core, which effectively protects the web from damage and permits the core to takes up the web irrespective of its widths in a steady and reliably manner.

To summarize the effects produced by the present invention, the web may be taken up after only a small part at the leading end thereof is engaged by the core, and this does not involve winding of the web twice or so around the core periphery in preparation for a takeup operation as practiced in the prior art. The problem of leaving a large portion of the web unused and wasted is now completely eliminated. Since the leading end of the web is engaged by the engaging means, the web is taken up by the core reliably with markedly reduced chances of takeup faults. The engaging means has a simple construction and does not press the web against the core, thereby effectively avoiding damage to the web to maintain high web quality. Further, the takeup apparatus according to the present invention accommodates various widths of the web and therefore has wide application. Thus the invention eliminates all of the problems of this type of takeup apparatus encountered in the prior art and provides many outstanding advantages.

BRIEF DESCRIPTION OF THE DRAWINGS

These and other objects, advantages and features of the present invention will become apparent from the following description taken in conjunction with the accompanying drawings which illustrate specific embodiments of the invention and in which.

DETAILED DESCRIPTION OF THE INVENTION

Figure 10:
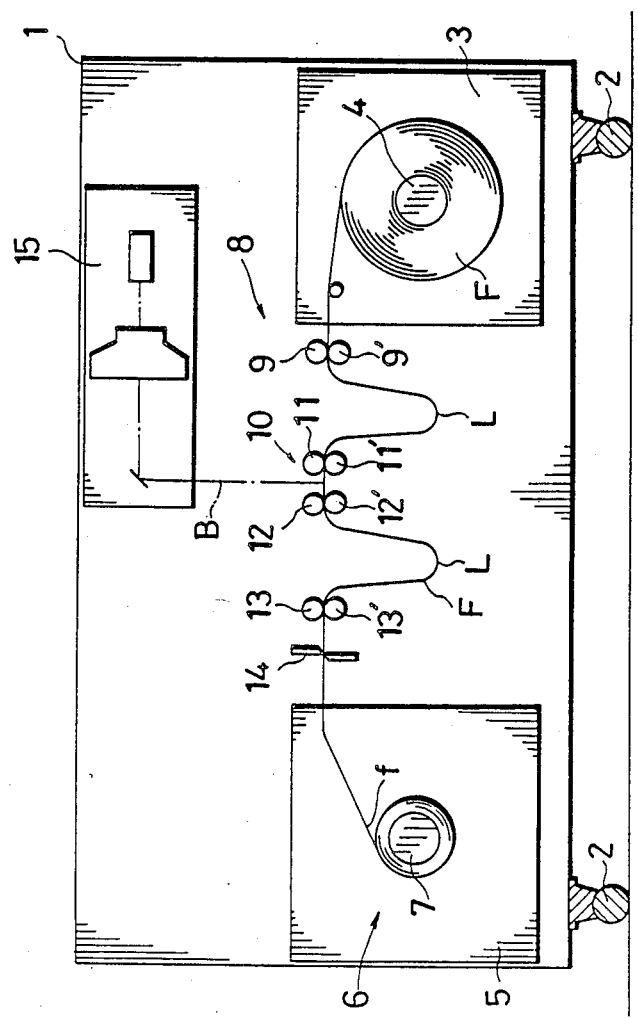
FIG. 10 is a schematic sectional front view of a laser imager in which the web takeup apparatus according to the present invention is used.

First, reference is made to FIG. 10 showing a laser imager in a sectional front view as one example of application of the present invention. The laser imager comprises a machine body 1 having casters 2 and including a box-like supply magazine 3 in one end thereof. The supply magazine 3 contains an elongate web F of photosensitive material such as a film, printing paper or the like wound on a center core 4 to be ready for use. The machine body 1 further includes a takeup magazine 5 in the other end thereof. The takeup magazine 5 houses a web takeup apparatus 6 with a takeup core 7 disposed in a central portion of the takeup magazine 5 for taking up the web F having been exposed and bearing images.

The supply magazine 3 and takeup magazine 5 are interposed by a web transport system 8. This transport system 8 includes, in the order of arrangement from near the supply magazine 3, a pair of feed rollers 9, 9', a first pair of rollers 11, 11' and a second pair of rollers 12, 12' forming an auxiliary scanning station 10, a pair of discharging rollers 13, 13', and a cutter 14. The second pair of rollers 12, 12' are drive rollers, and the first pair of rollers 11, 11' are follower rollers acting to prevent uplift of the web F at normal times and are powered only when advancing a leading end of the web F.

The web F is successively illuminated and scanned, while being transported through the auxiliary scanning station 10, by a laser beam B from a laser optical system 15. More particularly, the laser beam B scans and forms images on the web F transversely or at right angles to the direction of web transport, with the auxiliary scanning station 10 causing the web F to be scanned longitudinally or in the direction of web transport.

With the above construction, when the supply magazine 3 is loaded and the core 4 is rotated, the web F is fed to the transport system 8 and is taken up from its leading end f by the core 7 in rotation in the takeup magazine 5.

At the auxiliary scanning station 10 the laser beam B from the laser optical system 15 illuminates and scans the web F to record images thereon. A very high degree of precision is required at the auxiliary scanning station 10, and therefore the web F is allowed to sag in loops L, L at positions upstream and downstream of the auxiliary scanning station 10 in order that the auxiliary scanning station 10 be unaffected by speed errors, vibrations and the like of the feed rollers 9, 9' and discharge rollers 13, 13'.

After an image forming process is completed, the web F is cut by the cutter 14 to allow only an image bearing portion of the web F to be taken up by the takeup core 7. Thereafter the takeup magazine 5 is removed from the laser imager and the web F bearing images is put to a developing process.

Figure 1:
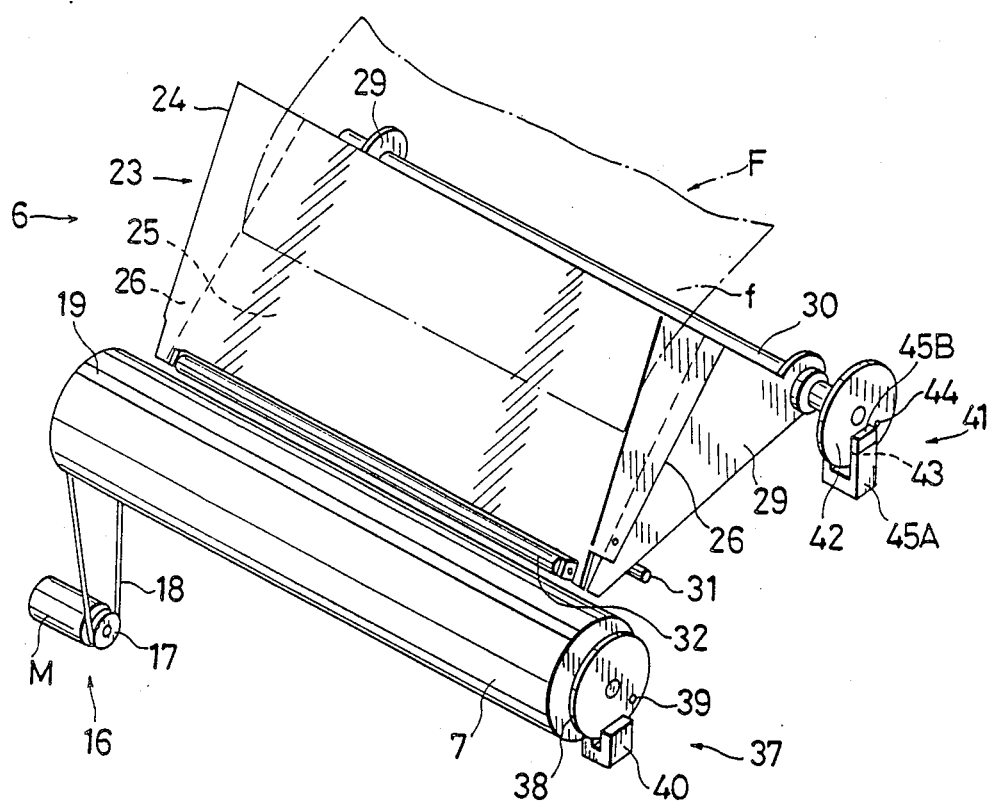
FIG. 1 is a perspective view of a web takeup apparatus embodying the present invention.

The web takeup apparatus 6 will be described next with reference to FIG. 1 showing its perspective and FIGS. 2 through 4 which are front views thereof for illustrating its operation.

The web F comprises a film, tape, printing paper or the like in an elongate sheet form. The printing paper, for example, may have varied widths in the order of 76.2 to 355.6 mm and in the illustrated embodiment comprises a stiff material having a thickness 0.20 to 0.24 mm.

Figure 5:
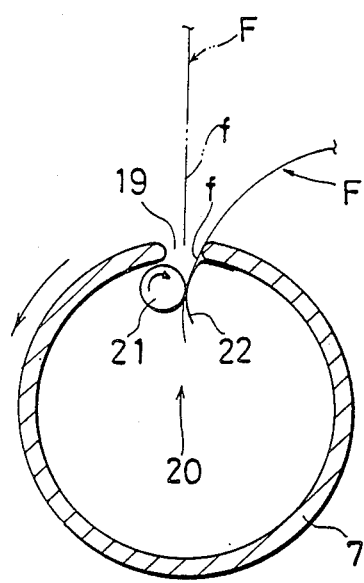
FIG. 5 is an enlarged sectional front view of a takeup core in a web engaging state.
Figure 6:
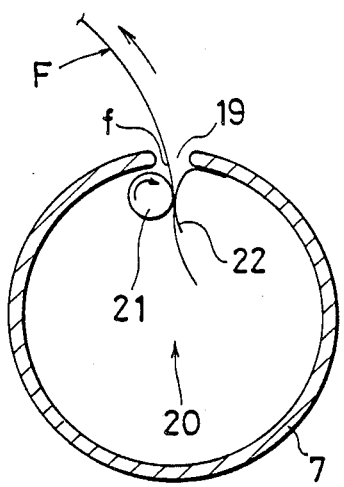
FIG. 6 is an enlarged sectional front view of the takeup core in a web release state.

The takeup core 7 has a cylindrical shape, and comprises a cylindrical body as also seen from FIGS. 5 and 6 and side plates, not shown, for closing opposite ends of the cylindrical body. The takeup core 7 is supported by a frame, not shown, of the machine body 1 (FIG. 10) through a horizontal rotary shaft to be rotatable by a drive mechanism 16. The drive mechanism 16 includes a drive source or motor M, and a pulley 17 and a belt 18 for transmitting the drive of motor M to the takeup core 7. The motor M is rotatable at a constant speed, and is put into and out of action repeatedly during a web takeup as appropriate to adjust an amount of web F taken up by the core 7.

The cylindrical body of takeup core 7 defines a slit 19 extending axially thereof over a length slightly exceeding a maximum width of the web F taken up by the takeup core 7. The takeup core 7 contains a web engaging mechanism 20 associated with the slit 19. As also shown in FIGS. 5 and 6, the engaging mechanism 20 in this embodiment includes a catch roller 21 and a leaf spring 22. The catch roller 21 is opposed to the slit 19 and extends between the side plates of the takeup core 7 to be rotatable, for example, only clockwise by means of a one-way clutch not shown. The leaf spring 22 is secured at a proximal end to an inside wall of the takeup core 7 adjacent the slit 19, with an intermediate position thereof in pressure contact with the catch roller 21 and a free distal end extending further toward the axis of takeup core 7.

The web takeup apparatus 6 further comprises a guide assembly 23 including an upper guide plate 24, a lower guide plate 25 opposed to the upper guide plate 24, and opposite side plates 26, 26 interconnecting the upper and lower guide plates 24, 25. The guide assembly 23 defines a broad inlet opening 27 opposed to the transport system 8 (FIG. 10) and a narrow outlet opening 28 opposed to the takeup core 7. The upper and lower guide plates 24 and 25 gradually approach each other as they extend from the inlet opening 27 to the outlet opening 28. Support plates 29, 29 extend downwardly from opposite lateral ends of the lower guide plate 25, respectively, with lower ends thereof fixed to a horizontal rotary shaft 30 pivoted to the frame of machine body 1. The rotary shaft 30 is disposed outwardly of a radius of an entire web F wound around the takeup core 7 to be out of contact with an outer peripherally thereof.

The guide assembly 23 is oscillatable about the rotary shaft 30 and, when the web F is not being taken up, is set to an initial position lowered by gravity into abutment with and supported by a stopper pin 31 supported by the frame of machine body 1 to extend transversely of the latter. The guide assembly 23 may be movable from the initial position in a linear or other mode instead of being oscillatable therefrom as illustrated. The guide assembly 23 receives an upward pressure from the web F when the web F has its leading end f engaged by the engaging mechanism 20 and advances from the transport system 8 toward the rotating takeup core 7 through a path shifted from a path through which the web F extends prior to winding onto the takeup core 7. This upward pressure causes the guide assembly 23 to oscillate away from the initial position. Whilst the guide assembly 23 contacts the web F by gravity to receive the upward pressure in the illustrated embodiment, this construction may be varied such that a spring is provided between the guide assembly 23 and the frame to apply to the guide assembly 23 a pressure acting in a downward or other direction to contact the web F.

Numbers 32 and 33 indicate free rollers extending along ends of the upper and lower guide plates 24, 25 adjacent the outlet opening 28. Upstream of the guide assembly 23 there are, in the order of arrangement from near the transport system 8, a detecting switch 34 such as a microswitch for detecting the web F, stationary guide plates 35 fixed to the frame, and flexible guide sheets 36 attached at respective one end thereof to the stationary guide plates 35 and extending to the guide assembly 23.

A position setting device 37 is provided for placing the slit 19 of the takeup core 7 in a position opposed to the outlet opening 28 to the guide assembly 23 in the initial position. As shown in FIG. 1, the position setting device 37 includes a disk 38 fixed coaxially to one end of the takeup core 7 and defining a bore 39 at a selected position thereof, and a photoswitch 40 of the light transmission type fixed to the frame for monitoring the bore 39. The motor M of the drive mechanism 16 is driven and stopped in response to switching actions of the photoswitch 40. More particularly, the positional relationship is such that the bore 39 defined in the disk 38 is opposed to the photoswitch 40 when the slit 19 in the takeup core 7 is opposed to the outlet opening of the guide assembly 23 in the initial position. In this state, light emitted from an emitter of the photoswitch 40 reaches a receiver thereof to operate the photoswitch 40 whereby the motor M of drive mechanism 16 is stopped. The illustrated position setting device 37 may be modified to comprise a light reflecting point mark defined on the disk 38 instead of the bore 39, and a photoswitch of the light reflection type instead of the light transmission type for monitoring the point mark. Further modifications are possible such as by replacing the photoswitch with a microswitch or other sensor of various types or by controlling the rotation of takeup core 7 instead of the motor M of drive mechanism 16.

Figure 7:
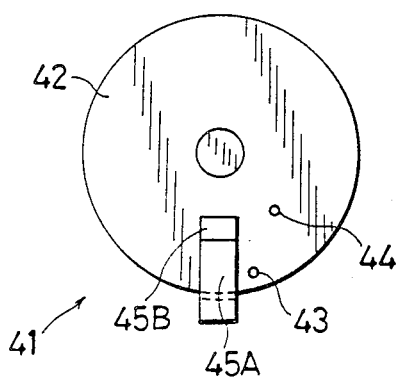
FIG. 7 is an enlarged front view of a wind detecting device with two bores out of register with a photoswitch.
Figure 8:
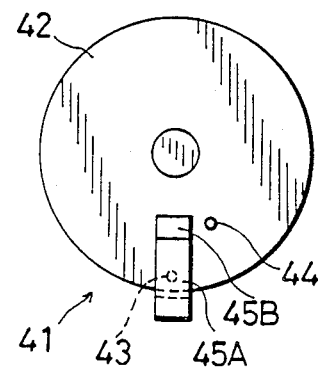
FIG. 8 is an enlarged front view of the wind detecting device with one of the bores in register with the photoswitch.

A wind detecting device 41 is provided for detecting winding of the web F onto the takeup core 7 by confirming the oscillation of the guide assembly 23 from the initial position under the upward pressure applied thereto by the web F advancing to the takeup core 7 through a path which, as described hereinbefore, is shifted from the path of its extension prior to the winding. As shown in FIG. 1, 7 and 8, the wind detecting device 41 includes a disk 42 fixed to the rotary shaft 30 of the guide assembly 23 and defining bores 43 and 44 at selected positions thereof, and photoswitches 45A and 45B of the light transmission type for monitoring the bores 43 and 44, respectively. The bores 43 and 44 and photoswitches 45A and 45B are in such a positional relationship that the bore 43 is opposed to the photoswitch 45A when the guide assembly 23 is in the initial position resting on the stopper pin 31, and the bore 44 is opposed to the photoswitch 45B when the guide assembly 23 has oscillated clockwise by a predetermined amount from the initial position under the upward pressure as described.

The photoswitches 45A and 45B take a switching action with light from emitters reaching receivers thereof when the bores 43 and 44 are opposed to the photoswitches 45A and 45B, respectively. When the bore 43 is opposed to the photoswitch 45A, the guide assembly 23 is confirmed to be in the initial position ready for a web takeup and this is indicated, for example, on an indicator panel of the laser imager. When the bore 44 is opposed to the photoswitch 45B after the web takeup is commenced, this signifies a detection of the guide assembly 23 having oscillated by the predetermined amount from the initial position or the web F having positively wound onto the takeup core 7 with its leading end f engaged by the engaging mechanism 20. On the basis of this detection the motor M of drive mechanism 16 continues to drive the takeup core 7 to take up the web F. During this time the indicator panel may give a corresponding indication. If the bore 44 does not move to the position opposed to the photoswitch 45B, it is judged that the leading end f of web F is not properly wound onto the takeup core 7 whereupon the motor M is stopped and an indication to that effect is given by the indicator panel.

It is of course possible to employ a mode without the bore 43, and the wind detecting device 41 may be varied in many ways from the illustrated example as hereinbefore described in connection with the position setting device 37.

Figure 9:
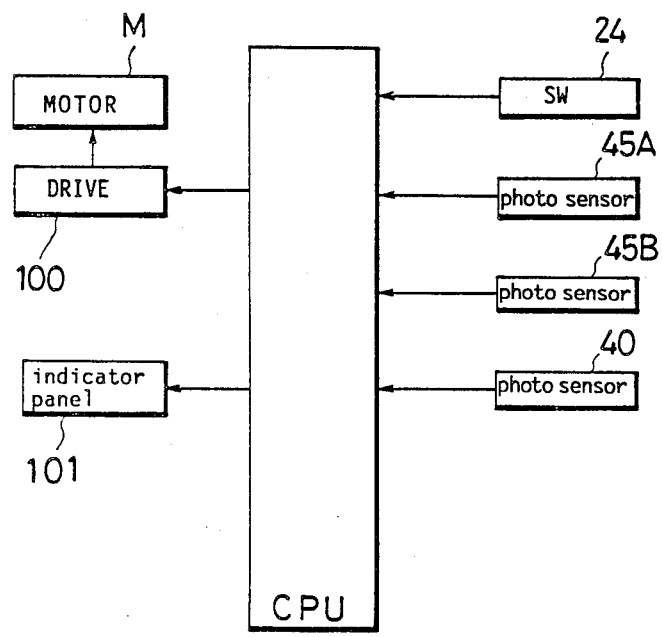
FIG. 9 is a block diagram of a web takeup control circuit.

FIG. 9 is a block diagram of a control circuit for controlling the web takeup in the described laser imager. Reference CPU in FIG. 9 indicates a microcomputer having input ports for receiving signals from the microswitch 34, photosensors 45A and 45B and photosensor 40, and output ports connected to a drive circuit 100 for driving the motor M and the indicator panel 101 provided on the body of the laser imager. Through this circuit the microcomputer CPU controls the operation of motor M and the indications on the indicator panel in response to the signals input from the various switches and sensors.

Figure 2:
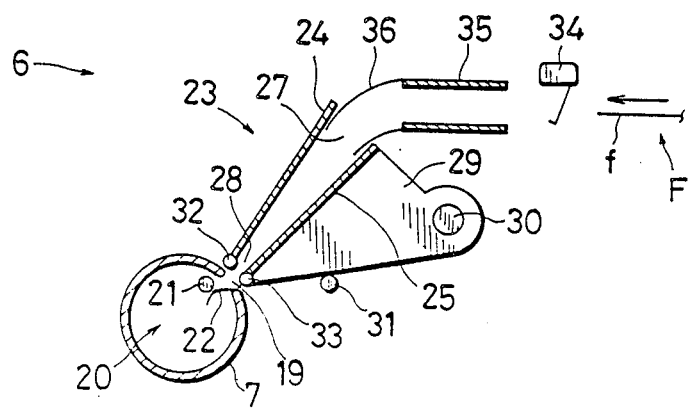
FIG. 2 is a sectional front view of the web takeup apparatus in a pre-operation state.

According to the web takeup apparatus having the above construction, first the slit 19 defined in the takeup core 7 is set by the position setting device 37 to the position opposed to the outlet opening 28 of the guide assembly 23 as shown in FIG. 2.

More particularly, after the bore 43 and photoswitch 45A confirm that the guide assembly 23 is in the initial position, the microcomputer CPU outputs a control signal to the motor drive circuit to drive the motor M. Then the motor M rotates the takeup core 7 and the disk 38 of position setting device 37 together. When the bore 39 moves to the position opposed to the photoswitch 40 which monitors the bore 39, the photoswitch 40 is operated to cause the microcomputer CPU to output the control signal whereupon the motor M is stopped. Thus, the slit 19 is set to the position opposed to the outlet opening 28.

Thereafter the web F transported by the transport system 8 is detected by the detecting switch 34, and then advances through the stationary guide plates 35 and guide sheets 36 into the guide assembly 23.

The leading end f of web F proceeds from the inlet opening 27 through the guide assembly 23 to the outlet opening 28 to be guided by the guide assembly 23 toward the center of takeup core 7 as shown in a phantom line in FIG. 5. The leading end f proceeds further into the slit 19 of takeup core 7 to reach the engaging mechanism 20 where the leading end f is nipped between the catch roller 21 and leaf spring 22.

Figure 3:
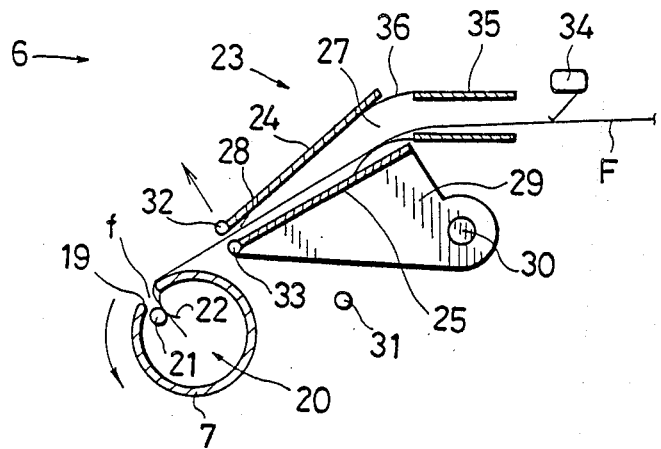
FIG. 3 is a sectional front view of the apparatus in operation.

Subsequently, as shown in FIGS. 3 and 5, the motor M starts driving the takeup core 7 to rotate counterclockwise for taking up the web F. Since the leading end f of web F is engaged by the engaging mechanism 20, the web F becomes positively wound on the periphery of the takeup core 7 and continues to be taken up by the takeup core 7 in a reliable manner.

Since the catch roller 21 is rotatable only clockwise, that is in a direction to nip the web F with the leaf spring 22, the leading end f of web F is positively caught between the catch roller 21 and leaf spring 22 without ever pulling out of the slit 19 by virtue of a friction provided by the catch roller 21 and the pressure applied by the leaf spring 22. the reliable engagement may be further assured by feeding the web F at this time at a speed equal to or slightly lower than a takeup speed of the core 7 though the subsequent takeup is carried out with a reverse speed relationship.

The takeup core 7 starts rotating for the web takeup, or the motor M of drive mechanism 6 starts driving the takeup core 7, upon lapse of a predetermined time after the detecting switch 34 detects passage of the web F, and this timing is effected by means of the computer CPU in the illustrated embodiment. This construction may be modified by mounting the detecting switch inside the takeup core 7 for detecting the leading end f of web F entering the takeup core 7 and directly starting the motor M upon detection. However, the illustrated embodiment has the advantage of facilitating removal from the laser imager of the takeup magazine 5 containing the takeup core 7 and the web F taken up thereon (FIG. 10) since no electrical contacts or the like are involved and the construction is therefore simple and relatively free from malfunctioning.

When the web F is wound onto the periphery of the takeup core 7 with its leading end f engaged by the engaging mechanism 20 as described hereinbefore, the web extends from the transport system 8 to the takeup core 7 through a path shifted from the path through which it extends prior to the winding. That is, the web F now extends in tension from the transport system 8 and the fixed guide plate 35 to the takeup core 7 and the engaging mechanism 20, and its path is shifted upwardly as seen in FIG. 3.

The web F then contacts the roller 32 of the guide assembly 23 and applies an upward pressure to the guide assembly 23. This causes the guide assembly 23 to oscillate clockwise about the rotary shaft 30 from the aforesaid initial position.

With the oscillation of the guide assembly 23 the disk 42 of wind detecting device 41 rotates to bring the bore 44 to the position opposed to the photoswitch 45B. The oscillation of the guide assembly 23 is thus confirmed, which indicates a positive winding of the web F onto the takeup core 7 with its leading end f engaged by the engaging mechanism 20.

In accordance with such detection, the motor M of drive mechanism 16 is allowed to remain in operation to continue the web takeup onto the takeup core 7.

If for some reason the leading end f of the web F should fail to wind onto the takeup core 7 properly with the path of web F remaining unchanged and the guide assembly 23 stationary, the bore 44 would not move to the position opposed to the photoswitch 45B. In this event, the microcomputer CPU, judging it to be a winding fault, outputs a control signal to a control circuit 100 for stopping the motor M to discontinue the operation of the entire laser imager including the web takeup apparatus 6. At the same time a corresponding indication is given on the indicator panel 101.

If the leading end F of the web F winds onto the takeup core 7 properly, the takeup operation is continued. As the amount of web F taken up by the takeup core 7 increases, the path of web F is shifted further upward thereby oscillating the guide assembly 23 clockwise to a great extent.

Figure 4:
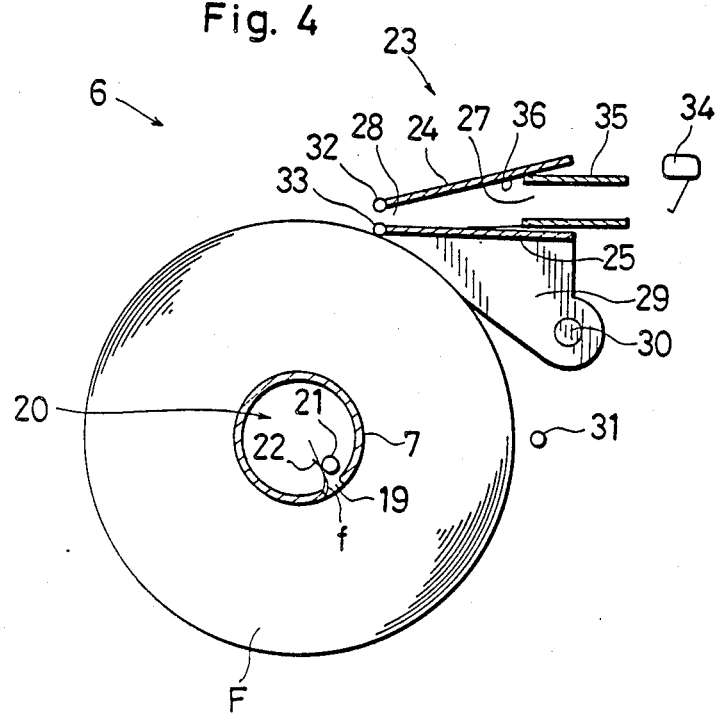
FIG. 4 is a sectional front view of the apparatus in a post-operation state.

Then, as shown in FIG. 4, the lower guide plate 25 of the guide assembly 23 contacts an outer periphery of the web F wound around the takeup core 7. Since this contact is made through the roller 33, the lower guide plate 25 will never damage the web F. Thus the web takeup onto the takeup core 7 is completed.

When rewinding the web F taken up on the takeup core 7, it is rewound as far as the leading end f engaged by the engaging mechanism 20. Then, as shown in FIG. 6, the web F is pulled with the leading end f inclined toward the catch roller 21 (in the upper leftward direction in the drawing) which is opposite to the inclination toward the leaf spring 22 (in the upper rightward direction) maintained during the web takeup. This action, combined with the stiffness of the web F, results in a pressing force applied to the leaf spring 22 thereby to relax the contact pressure between the catch roller 21 and leaf spring 22. Thus, the leading end f of the web is readily released from the engaging mechanism 20 for removal from the takeup core 7.

As hereinbefore described, only a small portion at the leading end f may be engaged by the engaging mechanism 20 to assure the winding of the web F onto the takeup core 7. Such an engagement leaves a minimum part of the web F unused, thereby substantially reducing waste of the web F.

The present invention employing the engaging mechanism 20 assures a reliable winding of the web F onto the takeup core 7 and a reliable subsequent takeup operation as well. The engaging mechanism 20 has a simple construction and does not rely on pressing of the web F against the takeup core 7, which effectively protects emulsion-coated photosensitive surfaces of the web F from damage. Further, webs F having various widths may be taken up in a steady, reliable manner simply be setting the lengths of the takeup core 7, slot 19 and engaging mechanism 20 so as to accommodate a maximum width of webs F.

Figure 11:
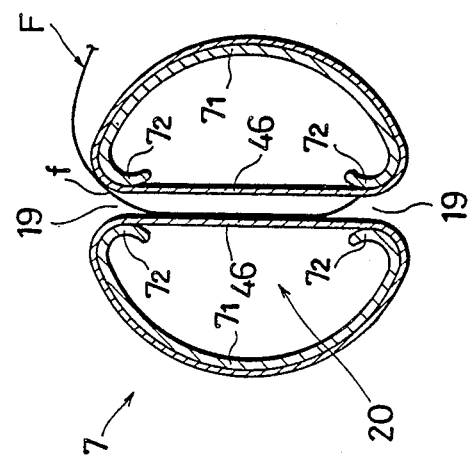
FIG. 11 is an enlarged sectional view of a modified takeup core.

FIG. 11 illustrates another example of a takeup core applicable to the web takeup apparatus of the present invention. This takeup core 7 has an axially bisected cylinder construction comprising an opposing pair of core members $7_1$ including inwardly curved ends $7_2$ defining slits 19 therebetween. In this relative position the core members $7_1$ are closed at opposite lateral ends and fixed to each other by side plates not shown. The core members $7_1$ are fitted with rubber belts 46 having a high coefficient of friction, respectively. The rubber belts 46 include outside portions overlying the core members $7_1$ and inside portions opposed to each other to constitute an engaging mechanism 20.

For taking up the web F, the takeup core 7 is rotated after the rubber belts 46 nip therebetween the leading end f of web F guided into the slit 19 from the outlet opening 28 of guide assembly 23. Then the web takeup by the core 7 progresses with the leading end f curved against the rubber belts 46 to be caught therebetween by the stiffness of the web F and frictional force of the rubber belts 46.

The takeup core 7 illustrated in FIG. 11 has the advantage that, when the web F is rewound and removed from the takeup core 7, the leading end f of the web F may be pulled out of the engagement with rubber belts 46 constituting the engaging mechanism 20 with great ease.

Figure 12:
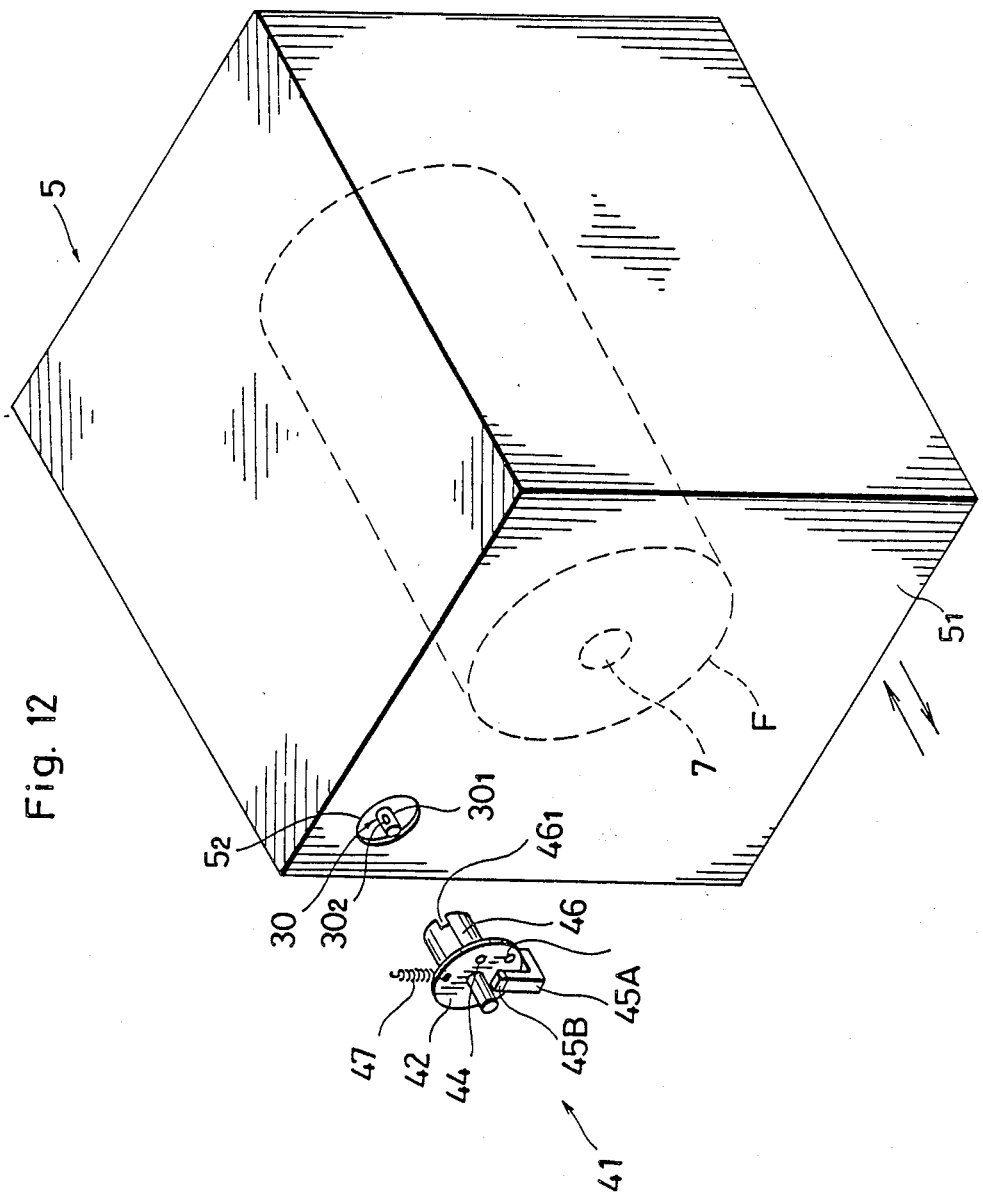
FIG. 12 is a perspective view of a modified wind detecting device.

FIG. 12 illustrates another example of wind detecting device applicable to the web takeup apparatus of the invention. In this example, the takeup magazine 5, which is movable axially of the takeup core 7 into and out of the laser imager, has a wall $5_1$ defing an opening $5_2$ through which an end $30_1$ of the rotary shaft 30 is exposed outwardly. This end $30_1$ carries an engaging pin $30_2$. The frame, not shown, of the body 1 of the laser imager supports a disk 42 through a horizontal rotary shaft. The disk 42 defines bores 43 and 44. These bores 43 and 44 are monitored by photoswitches 45A and 45B, respectively, these elements having the same constructions and mutual relations as already described.

The disk 42 includes a mounting element 46 fixed thereto and opposed to the end $30_1$ of the rotary shaft 30. The mounting element 46 defines a recess into which the end $30_1$ is inserted and a cutout $46_1$ for engagement with the engaging pin $30_2$. Number 47 indicates a spring for retaining the disk 42 and mounting element 46 in a predetermined position and a predetermined posture while the takeup magazine 5 is outside the laser imager.

According to the above construction, when the takeup magazine 5 is loaded into the laser imager, the web takeup apparatus 6 is in the pre-operation position as shown in FIG. 2 and the guide assembly 23 also is in the initial position. Then the end $30_1$ of rotary shaft 30 is inserted into the mounting element 46 and the engaging pin $30_2$ is placed in engagement with the cutout $46_1$. As the rotary shaft 30 rotates, the disk 42 connected thereto through the mounting element 46 rotates with the rotary shaft 30. This provides a detection of winding of the web F onto the takeup core 7 in the takeup magazine 5.

This embodiment is particularly advantageous in the following situation:

Where the web F comprises a photosensitive material which must be shielded from light, it is necessary to recover the taken-up web F from the laser imager in a light-shielded state. The wind detecting device 41 of this web takeup apparatus 6, which includes no electrical contacts and is free from communication faults, is capable of communicating the takeup detection to the laser imager without involving complicated relating elements and light-shielding arrangement. Where, as in the prior art, the wind detecting device is mounted inside the takeup magazine 5, electrical contacts must be provided for communication with the laser imager. Conversely, the wind detecting device mounted in the laser imager entails complications in the operation of the guide assembly and in the light-shielding provision for the takeup magazine 5. This embodiment eliminates all these inconveniences.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

I claim:

1. A web takeup apparatus for taking up a web fed thereto, comprising:
   a substantially cylindrical rotatable core for taking up the web on a peripheral surface thereof,
   a slit defined longitudinally of said core for receiving a leading end of the web,
   engaging means disposed adjacent said slit for engaging the leading end of the web received through said slit,
   guide means disposed adjacent said core for guiding the web fed thereto into said slit,
   drive means for driving said core in a direction to take up said web,
   detecting means for detecting the leading end of the web fed to said core, and
   position setting means for setting said slit to a position opposed to said guide means when said detecting means detects the leading end of the web.

2. A web takeup apparatus as claimed in claim 1, wherein said engaging means includes a roller rotatable in a direction to receive the web, and an elastic member provided for pressure contact with said roller, said engaging means engaging the leading end of the web by nipping the leading end of the web between said roller and said elastic member.

3. A web takeup apparatus as claimed in claim 2, wherein said guide means is oscillatable about an axis extending parallel to said core, through contact with the web taken up by said core and in an amount determined by a radius of the web taken up by said core.

4. A web takeup apparatus as claimed in claim 1, wherein said engaging means includes a member having a high coefficient of friction mounted peripherally of said core and extending into said slit.

5. A web takeup apparatus as claimed in claim 4, wherein said guide means is oscillatable about an axis extending parallel to said core, through contact with the web taken up by said core and in an amount determined by a radius of the web taken up by said core.

6. A web takeup apparatus for taking up a web fed thereto, comprising;
a substantially cylindrical rotatable core for taking up the web on a peripheral surface thereof,
engaging means provided at said core for gripping a leading end of the web,
drive means for driving said core in a direction to take up said web,
guide means for guiding the web fed thereto to said core, said guide means being movable by a tension of the web acting thereon as the core is driven with the web gripped by said engaging means, and
guide detecting means for detecting a movement of said guide means thereby to detect engagement of the leading end of the web by said engaging means.

7. A web takeup apparatus as claimed in claim 6, further comprising web detecting means for detecting the leading end of the web fed to said core, and control means for operating said drive means upon lapse of a predetermined time after said web detecting means detects the leading end of the web and for stopping said drive means when said guide detecting means fails to detect the movement of said guide means after said drive means is operated.

8. A web takeup apparatus for taking up a web fed thereto, comprising;
a substantially cylindrical rotatable core for taking up the web on a peripheral surface thereof,
a slit defined longitudinally of said core for receiving a leading end of the web,
engaging means disposed adjacent said slit for engaging the leading end of the web received through said slit,
guide means disposed adjacent said core for guiding the web fed thereto into said slit, said guide means being movable by a tension of the web acting thereon as the core is driven with the web engaged by said engaging means,
drive means for driving said core in a direction to take up said web, and
guide detecting means for detecting a movement of said guide means thereby to detect engagement of the leading end of the web by said engaging means.

9. A web takeup apparatus as claimed in claim 8, further comprising web detecting means for detecting the leading end of the web fed to said core, and position setting means for setting said slit to a position opposed to said guide means when said web detecting means detects the leading end of the web.

10. A web takeup apparatus as claimed in claim 8, wherein said guide means is oscillatable about an axis extending parallel to said core, through contact with the web taken up by said core and in an amount determined by a radius of the web taken up by said core.

* * * * *